US009278288B2

(12) United States Patent
McCarthy et al.

(10) Patent No.: US 9,278,288 B2
(45) Date of Patent: Mar. 8, 2016

(54) AUTOMATIC GENERATION OF A GAME REPLAY VIDEO

(71) Applicant: Google Inc., Mountain View, CA (US)

(72) Inventors: Alexander Ruben Stacey McCarthy, San Francisco, CA (US); Duncan John Curtis, Castro Valley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/169,219

(22) Filed: Jan. 31, 2014

(65) Prior Publication Data
US 2015/0217196 A1    Aug. 6, 2015

(51) Int. Cl.
| | |
|---|---|
| A63F 9/24 | (2006.01) |
| A63F 13/497 | (2014.01) |
| A63F 13/795 | (2014.01) |
| A63F 13/58 | (2014.01) |
| H04N 21/25 | (2011.01) |
| H04N 21/478 | (2011.01) |
| H04N 21/845 | (2011.01) |
| H04N 21/8549 | (2011.01) |

(52) U.S. Cl.
CPC ............... *A63F 13/497* (2014.09); *A63F 13/58* (2014.09); *A63F 13/795* (2014.09); *H04N 21/25* (2013.01); *H04N 21/4781* (2013.01); *H04N 21/8456* (2013.01); *H04N 21/8549* (2013.01)

(58) Field of Classification Search
CPC .............. H04N 21/25; H04N 21/4781; H04N 21/8456; H04N 21/8549
See application file for complete search history.

(56) References Cited

U.S. PATENT DOCUMENTS

| | | | |
|---|---|---|---|
| 9,055,343 B1* | 6/2015 | Lewis ................ | H04N 21/4826 |
| 2009/0113303 A1* | 4/2009 | Goossen et al. .............. | 715/719 |
| 2009/0133033 A1* | 5/2009 | Lindo et al. ................... | 718/108 |
| 2012/0059825 A1* | 3/2012 | Fishman ........... | G06F 17/30053 |
| | | | 707/737 |
| 2012/0100910 A1* | 4/2012 | Eichorn et al. .................. | 463/31 |
| 2013/0260896 A1* | 10/2013 | Miura et al. .................... | 463/42 |
| 2013/0274014 A1* | 10/2013 | Rom ...................... | A63F 13/12 |
| | | | 463/31 |
| 2014/0179439 A1* | 6/2014 | Miura et al. .................... | 463/42 |
| 2014/0282111 A1* | 9/2014 | Gurbag ................. | H04L 65/403 |
| | | | 715/756 |

OTHER PUBLICATIONS http://epicrewind.com/, visited Dec. 13, 2013.
http://wiki.teamfortress.com/wiki/Replay, visited Dec. 13, 2013.
https://support.google.com/plus/answer/3113884?hl=en, visited Dec. 13, 2013.

(Continued)

*Primary Examiner* — Corbett B Coburn
(74) *Attorney, Agent, or Firm* — Morriss & Kamlay LLP

(57) ABSTRACT

A video clip may be automatically generated from a gameplay recording based on an interest metric. The interest metric may be determined from a variety of sources, such as developer provided signals, platform-based signals, and reception signal. A machine learning technique may be applied to each of the signals individually and/or in aggregate (e.g., the interest metric) to ascertain a weighting scheme, for example, for each individual signal or the interest metric to improve the selection of portions of video from a gameplay recording.

20 Claims, 4 Drawing Sheets

(56) References Cited

OTHER PUBLICATIONS

Pan, H. et al.,"Detection of Slow-Motion Replay Segments in Sports Video for Highlights Generation", 2001 IEEE International Conference on Acoustics, Speech, and Signal Processing, vol. 3, pp. 1649-1652, May 2001.

Wang, Jinjun et al.,"Automatic Replay Generation for Soccer Video Broadcasting", Multimedia '04, Proceedings of the 12th annual ACM international conference on Multimedia, pp. 32-39, 2004.

\* cited by examiner

AUTOMATIC GENERATION OF A GAME REPLAY VIDEO

BACKGROUND

Some video games or third party applications allow a user to capture instances of a user's gameplay. The captured gameplay may be provided to the user in the form of a screen shot or a video. A user may subsequently edit a video, for example to eliminate uninteresting portions of the video or for size, and/or add effects to the video (e.g., overlay music, fade in/out, etc.).

BRIEF SUMMARY

According to an implementation of the disclosed subject matter, a recording of a video game may be obtained while the game is played by a first user. An indication of an interest metric that includes a frame indication may be received. One or more portions of the recording may be selected based on the interest metric. A first video clip may be generated based on the one or more portions of the recording. The first video clip may be provided.

In an implementation, a system may be provided that includes a database and a processor connected thereto. The database may be configured to store a recording of a video game. The processor may obtain the recording of the video game while the game is played by a first user. It may receive an indication of an interest metric that includes a frame indication. The processor may be configured to select one or more portions of the recording based on the interest metric. The processor may generate a first video clip based on the one or more portions of the recording and it may provide the first video clip.

The disclosed implementations may provide for rapid generation of a composite video of a portion of gameplay from an entire recording of the gameplay. The selected portions of the composite video may have been chosen based on a determined level of interest for each portion of video relative to other portions of video in the complete recording of gameplay. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
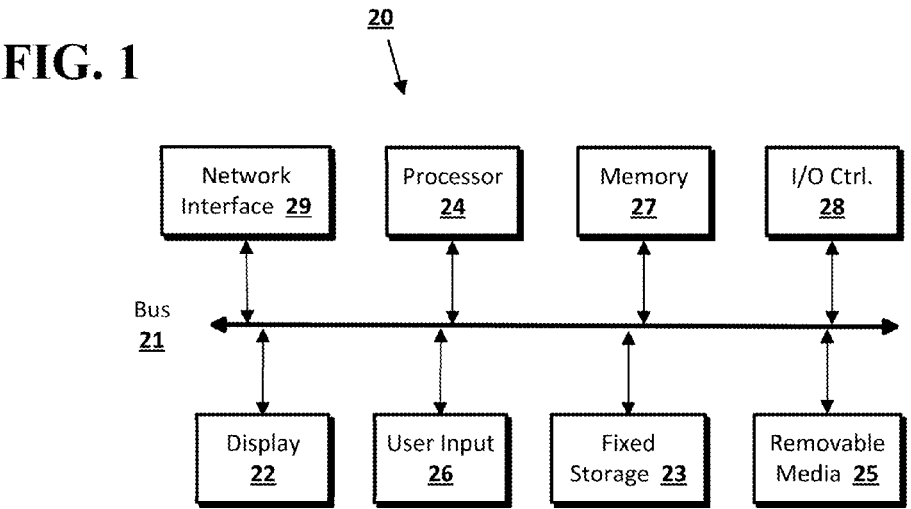
FIG. 1 shows a computer according to an implementation of the disclosed subject matter.

As disclosed herein, a user's gameplay may be recorded and the most interesting or exciting moments of the user's gameplay may be selected and spliced together in a shortened video clip or trailer. A user may elect to share the video clip electronically, for example on a social network or a content aggregation site.

A user may elect to allow the system to automatically record the screen while a user is playing a game. Recording gameplay may refer to capturing video as though it is played on the device or to capturing draw calls output or requested by a processor or graphics card. A draw call, for example, may be where the game instructs a graphics card to generate a box measuring 30 pixels by 80 pixels at particular coordinates on the screen of a user's device. Recording video while the game is playing ensures that unexpected events during gameplay are captured. For example, in a puzzle game, a user may rarely obtain a certain combination of matches and a rare combination may occur without warning to the user, making this a moment that would be missed unless every moment is recorded. Viewing the gameplay recording retrospectively may reveal that the majority of gameplay is uninteresting. For example, the user did not complete an in-game task, perform a special move, make a remarkable achievement (e.g., a high score), etc. However, at some points during the gameplay video, one or more interesting moments may have occurred.

An interesting moment in the game may be determined by applying a machine learning technique to select moments that are likely to be viewed as exciting by a majority of viewers. The machine learning technique may utilize data obtained from a variety of sources such as gameplay statistics obtained by the hardware or software platform on which the game operates, gameplay data provided by a developer, and user popularity as determined from user-uploaded content (e.g., a reception signal). An API may store achievement information for the game. The achievement information may, for example, include whether the user completed a task, achieved a certain score, performed a particular move, completed a level, etc. An API may be provided in which a developer may indicate that a particular moment within a game is interesting. A developer may provide a relative indication as to whether a specific moment in the game is interesting or not. For example, a developer may provide a signal to indicate that a particular user performed a keystroke combination successfully that resulted in a rare move being performed by the user's character. The information provided by each API may overlap. For example, the performance of a particular move may be reflected in completion of the move, the result of the move being performed, and a developer-provided signal to indicate that a user has successfully performed a keystroke combination resulting in the move.

One or both of the APIs described above may include, with a user's permission, touch input data or other data captured by sensors on a user's device (e.g., camera, microphone, etc.). For example, a user may be touching the screen of a device a lot during a particular moment of gameplay and this may be indicative of or associated with an interesting moment of gameplay. The system disclosed herein may determine whether or not the touch inputs resulted in any particular achievement. The touch input, for example, may be overlaid on the movie clip generated based on the interest metric, as described herein. For example, the movie clip may show specific keystrokes, button presses, and/or touch inputs on the screen that resulted in the interesting moment.

An interesting moment of gameplay may be determined by examining user-uploaded content. For example, a video aggregation web site may have several users who have uploaded one or more videos to the site. The site may collect data about content uploaded and/or user behavior while on the site. For example, the web site may maintain data about the popularity of a video, video length, repeat visits or plays of the video, the number of unique visits of the video, the amount of time a user spends watching a video, which portions of a video are watched by each user, etc. For example, from the data collected by web site, a video may be subdivided into thirty second segments and for each subsection, it may be determined what percentage of users discontinue viewing the video upon completing the segment. An analysis of the data may reveal that users who viewed the first twenty seconds of a video continued viewing the video for five or more seconds, indicating that these users are engaged or "hooked." An analysis of other parts of the video may not show any trends; that is, the other subsections of the video may appear random with respect to users viewing behavior. By applying a machine learning technique to the uploaded videos utilizing the data collected by the web site, interesting portions (e.g., subsections of a video where users appear to be hooked) may be identified. Thus, these subsections of gameplay may be utilized as a component to determine when an interesting moment has occurred in gameplay.

An interesting moment of gameplay may be based, therefore, on developer provided signals, platform-based signals, and user-uploaded content as described above. Each of these sources may be asynchronously provided to the system. For example, interesting moments derived from the user-uploaded content may be separately determined and/or updated from the other two sources. Each of the sources may be weighted. For example, it may be determined that interesting moments identified from the machine learning technique applied to user-uploaded content is a very good indicator of an interesting moment relative to developer- and platform-provided signals. The signal from the user-uploaded content may be weighted so that a combined signal from the three sources is more influenced by the user-uploaded content signal.

In an implementation, a composite score may be generated based on each of the three signals: developer-provided signals, platform-based signals, and user-uploaded content. A developer may provide a rating for a user's gameplay via an API as described earlier. The developer rating may indicate that an uninteresting portion of game play may be a zero while a user's performance of a particular task may be a three and very rare confluence of events for this particular game may result in a developer rating of a five. Likewise, the platform-provided signal may indicate that the user has completed a particular task or level and/or achieved a high score or scored an inordinate number of points. The platform-based signals may be assigned a rating based on the data obtained compared to data obtained for other players of the same game. For example, a user who completes level one may not be particularly rare; however, a user who completes level one while obtaining 95% of the available and/or possible points in level one may be very rare. The rating may be determined to be one for the former and five for the latter. The user-uploaded content signal may be similarly placed on a relative rating scale. For example, a particular segment of a video that always receives a large number of hits and consistently "hooks" users to a video may be deemed a rating of five. Other video segments that are less popular may receive lower ratings. The ratings for each of the three signals may be weighted as described earlier. The ratings may be received for each of the one or more signals in real-time as gameplay occurs. A composite score may be generated by a variety of methods. For example, the composite score may be represented by the sum of each of the three signals (and/or their weighted values) for each frame or portion of the recorded gameplay video. Other methods of scoring or generating a rating for each frame or portion of the video may be used according to implementations disclosed herein. For example, the developer-provided signal may be an indication that a particular event has occurred that is interesting. Thus, the rating from a developer may be binary or the system may compare the moments the developer deems interesting to other gameplay data to determine how interesting the moment is. A score does not need to be generated for any or each of the signals nor does a composite score.

The composite of the three signals may be an interest metric as disclosed herein. The interest metric may be a summed score or rating from each of the three signals, for example. The recorded video may be segmented according to the interest metric. For example, the recorded video for the entire gameplay may be one hour. Based on the interest metric, a threshold cutoff for a segment of video may be determined. If a thirty second movie clip of the gameplay is desired, the threshold may be selected by determining a value above which the sum length of the video segments would total thirty seconds. Thus, the threshold value may be dynamic in relation to the interest metric. Upon capturing the entire video of gameplay, the interest metric for each frame may be determined or the interest metric may be determined in near real-time as the video is recorded. Interesting moments of gameplay may be those for which the interest metric is high. Because each user will vary in skill and/or unexpected occurrences in a game, the interest metric for a particular user's gameplay may differ from another user playing the exact same level, board, scenario, etc. For example, the most interesting point for a first user may reflect a composite score of 5000 while a second user playing the exact same board may have a composite score of 7500. One or more segments may be selected to generate a movie clip or trailer of the user's gameplay based on the interest metric. Effects may be added to the video such as a music/sound effect overlay, video effects (e.g., fade in/out, zoom, etc.), speed of the video replay, etc.

In some configurations, the segments from a gameplay video may be ranked according to the interest metric. One or more segments from the gameplay video may be selected based on the ranking. Ranking may be performed at varying granularity. For example, the ranking may be performed on a frame by frame basis or on a segment by segment basis. Thus, a user who does not accomplish any tasks, perform special moves, or achieve any noteworthy scores will still be able to receive a movie clip according to implementations disclosed herein.

A machine learning technique may be applied to each of the signals and/or the interest metric (composite score) to aid in selecting which segments of a gameplay video should be splice together. For example, a machine learning technique may reveal that the interesting moments of a gameplay video occur reliably five seconds before the interest metric indicates a zenith and/or it may indicate an optimal length of a segment for the particular game. Optimal may be the length of a gameplay segment for which the interesting moment captured and/or other viewers of the segment typically engage with the segment. For example, the system could perform testing on users' preferences by selecting segments of the gameplay video to be combined in a movie clip. For one group of users, segments may be selected according to one set of criteria and for a second group of users a second set of criteria may be applied. For example, criteria may specify the manner by which segments are selected for inclusion into the movie clip. Examples of criteria may include, for example, an amount of time before and after an interest metric peak, the length of a segment, weight assigned to a particular keystroke combination, achievement, score, or task, etc. Feedback from the users may be obtained to determine whether the first or second set of criteria resulted in a better user experience. For example, the number of views of the movie clip, the number of times the movie clip was viewed by persons other than the user who created it, the number of times the video clip was posted to a web site or otherwise shared with other users, the amount of time a user spent viewing the movie clip, etc.

According to implementations disclosed herein, the curated gameplay video or movie clip may be shared with other users. For example, upon completing a level of a game, a user may be presented with the curated video and an option to share the video with the user's social network or with a video content aggregation web site. In the event the user does not enjoy the movie clip, in some configurations the user may request a reshuffle of the video clip. For example, the system may employ a different set of criteria to rank and/or select portions of the gameplay video. A new video clip may be generated according to the new criteria and provided to the user.

Figure 5:
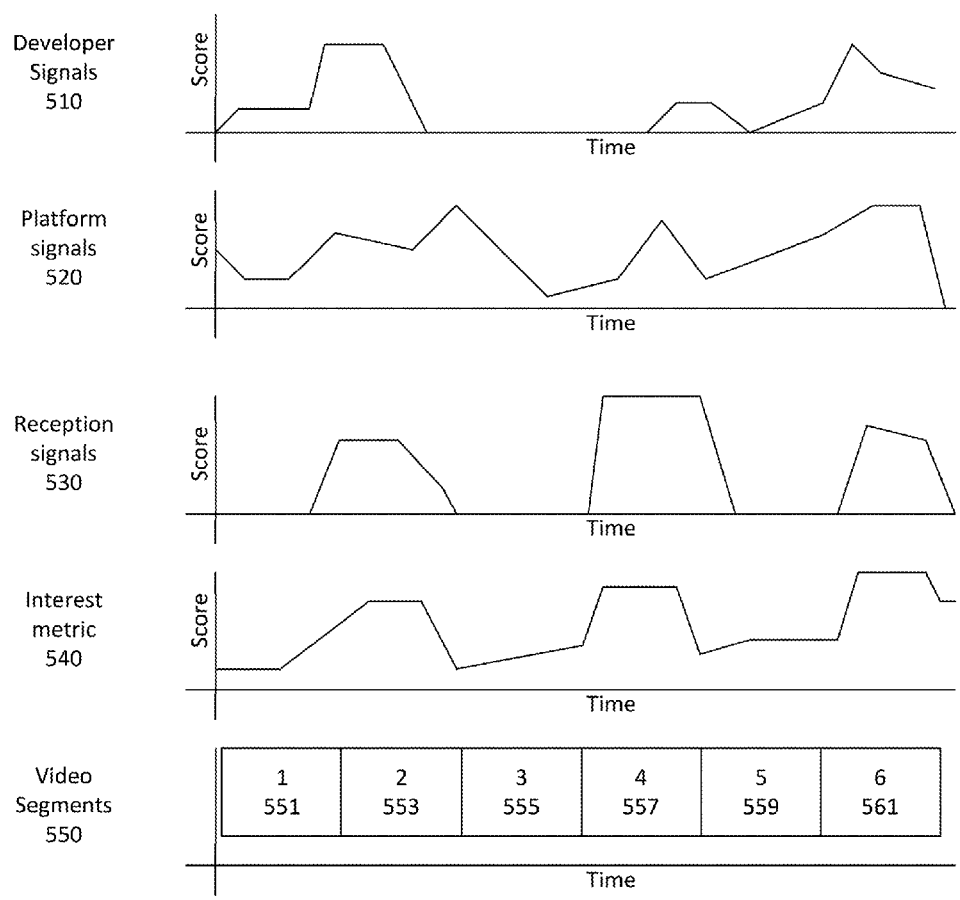
FIG. 5 is an example of the signals that may be obtained for a gameplay recording as disclosed herein.

FIG. 5 shows an example of the signals that may be obtained for a gameplay recording. For each of the developer signals 510, the platform signals 520, the reception signals 530, and the interest metric 540, a graph is shown that represents a score obtained from each of the respective signals over the time of the gameplay recording. The video has been segmented into six equal length blocks 551, 553, 555, 557, 559, 561 as shown by the graph corresponding to the video segments 550. Segmentation may, however, be performed subsequent to the determination of the interest metric and/or based on the score computed for the interest metric. The score may be computed as disclosed herein. In some instances, a score may not be continuous. For example, no data were received from the developer signals 510 for a period of time approximately between second and fourth video segments 550. An interest metric may be generated from each of the developer signals 510, the platform signals 520, and the reception signals 530. As above, the interest metric may weight one or more of the signals such that some signals may not contribute equally to the interest metric. The interest metric indicates that video segments 550 represented by blocks 2 553, 4 557, and 6 561 contain the highest interest metric score. Those segments may be combined to form a video clip. In some configurations, the segments may be adjusted to obtain a better sample of the gameplay recording. For example, block 2 553 may miss a portion of interesting content that immediately precedes it and includes some relatively uninteresting content at the end. The segment may be adjusted to include frames before its predefined segment boundary and not include content at its right-side boundary. Similarly, the segments may be selected based on an average of interest metric scores for each frame bounded by a block, for example.

Figure 3:
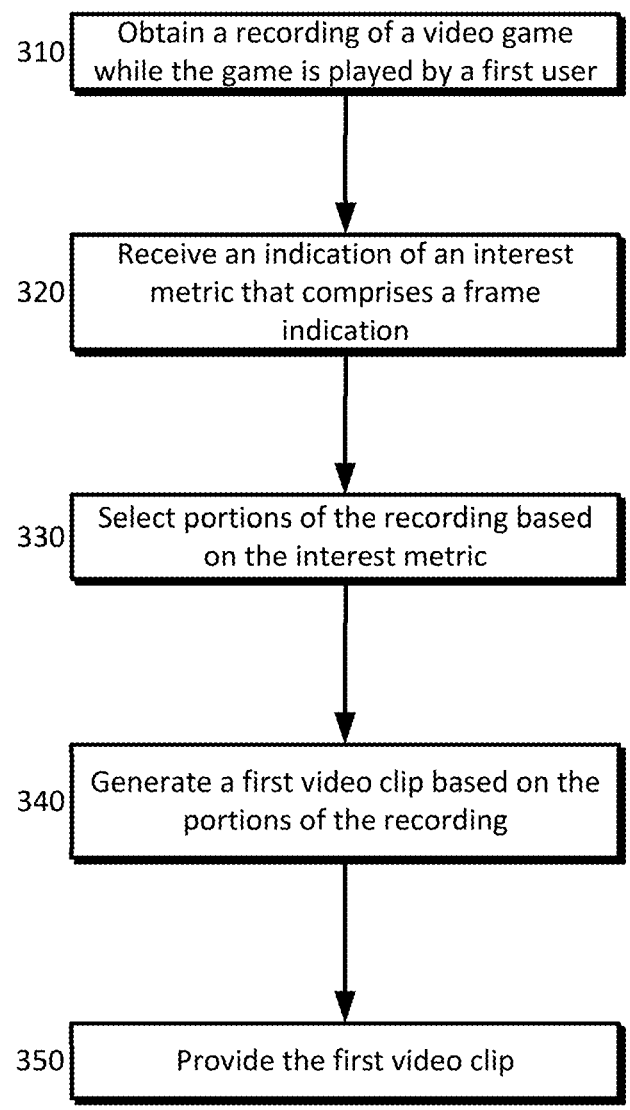
FIG. 3 is an example method for generating a first video clip from selected portions of a game recording as disclosed herein.

As shown by the example in FIG. 3, in an implementation a recording of a video game may be obtained while the game is played by a first user at 310. The recording may be the video output to the user's device and/or draw calls output by the user's processor or graphics processor. An indication of an interest metric may be received at 320. The interest metric may include a frame indication. For example, during recording of the gameplay video, each of the signals described above may be associated with a particular frame of the gameplay video or a frame may be inferred based on a timestamp indicating when during gameplay the signal was sent and/or recorded. More generally, the frame indication may indicate a temporal location within the video based on a specific frame, a frame range, a timestamp, an elapsed time, or the like. The frame indication may refer to one or more frames in a collection of frames. For example, the frame indication may refer to frames 320-450 and frames 15,000-16,000 in a collection of 100,000 frames.

The recording may be segmented, for example, according to predefined criteria such as segmenting the recording into ten second blocks. It may be segmented based on the interest metric in some configurations or other criteria. The interest metric may be determined as described above, for example, from developer-provided signals, a reception signal, and/or a game signal (e.g., a platform-based signal). One or more portions of the recording may be selected based on the interest metric at 330. Each portion of the recording may include one or more frames. A first video clip may be generated based on the one or more portions of the recording at 340. The first video clip may be provided at 350, for example, to a first user. A request may be received to assemble a second video clip, for example, where the user desires a remash, reshuffle, or new video clip. A second set of portions of the recording may be selected based on the interest metric and/or the portions selected for the first video clip. For example, in some configurations the system may select portions of the recording according to a different set of criteria. It may also select portions according to what portions it previously selected for inclusion in the first video clip. There may be some overlap in the portions selected for the first video clip and the second video clip. The selected second portions of the recording may be combined into a second video clip and provided, for example, to the first user.

In some configurations, the generated video clips and/or the associated interest metric for each segment included in a video may be stored. A comprehensive video clip may be generated based on a specified time period. For example, a user may have accumulated ten video clips for a particular game over the course of a year. A comprehensive video clip may be generated for that particular game based on the segments of video and/or the associated interest metrics for the ten video clips that were previously produced. In some configurations, video clips that have been generated from multiple different games may be combined in one comprehensive video. For example, a user may have ten videos from game A, five videos from game B, and one video from game C. Each of the segments that make up the respective video clips and/or the corresponding interest metrics for those segments may be used as the basis of a comprehensive video. In some instances, the system may require that the amount of segments included from a particular game type must be in proportion to the number of video clips. Thus, in the example above, video game A would be represented ten times as much as video game C in the comprehensive clip.

Figure 4:
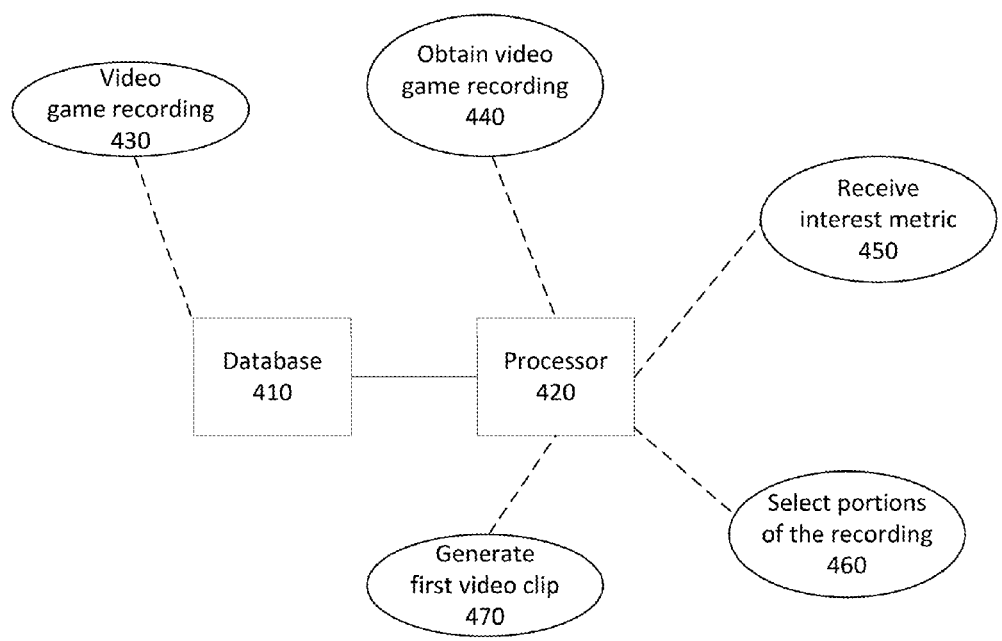
FIG. 4 is an example system for generating a first video clip from selected portions of a game recording as disclosed herein.

In an implementation, an example of which is provided in FIG. 4, a system is disclosed that includes a database 410 and a processor 420 connected thereto. The database 410 may store a recording of the video game 430. The processor 420 may obtain the recording of a video game 430 while the game is played by a first user 440. It may receive an indication of an interest metric 450 that comprises a frame indication. The frame indication may identify a temporal location within the recording. The processor 420 may select a plurality of portions of the recording based on the interest metric 460. The processor 420 may generate a first video clip 470 based upon the plurality of portions of the recording. The processor 420 may be configured to provide the first video clip.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
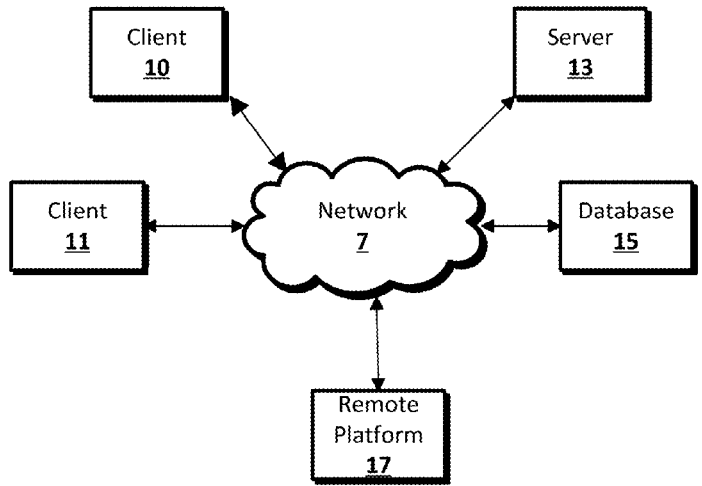
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
   obtaining, at a processor, a recording of a video game signal while a video game is played by a user;
   receiving, at the processor, an interest metric signal that comprises a frame indication, the frame indication identifying a temporal location within the recording;
   determining, at the processor, a first plurality of portions of the recording based on the interest metric signal;
   determining, at the processor, ranks for the first plurality of portions;
   generating, at the processor, a first video clip signal based upon the first plurality of portions of the recording and the ranks; and
   providing, via the processor, the first video clip signal.

2. The method of claim 1, wherein the interest metric signal comprises at least one signal selected from the group consisting of: a developer-provided signal, a reception signal, and a game signal.

3. The method of claim 1, wherein the interest metric signal comprises a developer-provided signal that indicates a portion of the video game signal indicated as likely to be of interest by a developer of the video game.

4. The method of claim 1, further comprising:
   receiving, at the processor, a request to assemble a second video clip signal;
   determining, at the processor, a second plurality of portions of the recording based on the interest metric signal and the first plurality of portions for the first video clip signal;
   combining, at the processor, the second plurality of portions of the recording into a second video clip signal; and
   providing, via the processor, the second video clip signal.

5. The method of claim 1, further comprising recording, via the processor, a touch input.

6. The method of claim 5, wherein the first video clip signal includes a representation of the touch input corresponding to the first plurality of portions.

7. The method of claim 1, further comprising determining, via the processor, an audio track for the first video clip signal, wherein the first video clip signal further comprises the audio track.

8. The method of claim 1, further comprising determining, via the processor, a video effect for the first plurality of portions.

9. The method of claim 8, wherein the first video clip signal further comprises the video effect.

10. The method of claim 1, wherein the first plurality of portions comprises a plurality of frames.

11. A system, comprising:
    a database configured to store a recording of a video game signal;
    a processor connected to the database and configured to:
      obtain the recording of the video game signal while a video game is played by a user;
      receive an interest metric signal that comprises a frame indication, wherein the frame indication identifies a temporal location within the recording;
      determine a first plurality of portions of the recording based on the interest metric signal;
      determine ranks for the first plurality of portions;
      generate a first video clip signal based upon the first plurality of portions of the recording and the ranks; and
      provide the first video clip signal.

12. The system of claim 11, wherein the interest metric signal comprises at least one signal selected from the group consisting of: a developer-provided signal, a reception signal, and a game signal.

13. The system of claim 11, wherein the interest metric signal comprises a developer-provided signal that indicates a portion of the video game signal indicated as likely to be of interest by a developer of the video game.

14. The system of claim 11, wherein the processor is further configured to:
    receive a request to assemble a second video clip signal;
    determine a second plurality of portions of the recording based on the interest metric signal and the first plurality of portions for the first video clip signal;
    combine the second plurality of portions of the recording into a second video clip signal; and
    provide the second video clip signal.

15. The system of claim 11, wherein the processor is further configured to record a touch input.

16. The system of claim 15, wherein the first video clip signal includes a representation of the touch input corresponding to the first plurality of portions.

17. The system of claim 11, wherein the processor is further configured to determine an audio track for the first video clip signal, wherein the first video clip signal further comprises the audio track.

18. The system of claim 11, wherein the processor is further configured to determine a video effect for the first plurality of portions.

19. The system of claim 18, wherein the first video clip signal further comprises the video effect.

20. The system of claim 11, wherein the first plurality of portions comprises a plurality of frames.

* * * * *